United States Patent
Tomita

(10) Patent No.: US 7,523,855 B2
(45) Date of Patent: *Apr. 28, 2009

(54) SYSTEMS AND METHODS FOR PRESERVING AND MAINTAINING DOCUMENT INTEGRITY

(75) Inventor: Hiroshi Tomita, Palo Alto, CA (US)

(73) Assignee: Konica Minolta Systems Laboratory, Inc., Foster City, CA (US)

( * ) Notice: Subject to any disclaimer, the term of this patent is extended or adjusted under 35 U.S.C. 154(b) by 509 days.

This patent is subject to a terminal disclaimer.

(21) Appl. No.: 11/090,229

(22) Filed: Mar. 28, 2005

(65) Prior Publication Data
US 2006/0213965 A1    Sep. 28, 2006

(51) Int. Cl.
*G06F 17/00* (2006.01)

(52) U.S. Cl. .................. 235/375; 235/462.01; 235/487; 235/494

(58) Field of Classification Search ............ 235/462.01, 235/487, 488, 494, 375
See application file for complete search history.

(56) References Cited

U.S. PATENT DOCUMENTS

| | | | |
|---|---|---|---|
| 5,486,686 A | 1/1996 | Zdybel, Jr. et al. | |
| 5,734,800 A | 3/1998 | Herbert et al. | |
| 5,862,270 A | 1/1999 | Lopresti et al. | |
| 6,082,619 A | 7/2000 | Ma et al. | |
| 6,115,508 A | 9/2000 | Lopresti et al. | |
| 6,418,244 B2 | 7/2002 | Zhou et al. | |
| 6,567,530 B1 | 5/2003 | Keronen et al. | |
| 6,674,456 B2 * | 1/2004 | Miyazaki | 347/171 |
| 7,020,327 B2 | 3/2006 | Tack-don et al. | |
| 7,032,823 B2 | 4/2006 | Nojiri | |

* cited by examiner

*Primary Examiner*—Karl D. Frech
(74) *Attorney, Agent, or Firm*—Finnegan, Henderson, Farabow, Garrett & Dunner LLP

(57) ABSTRACT

Systems and methods consistent with embodiments of the present invention provide for a method for preserving and maintaining document integrity. In some methods for preserving and maintaining document integrity, the contents of a document, or contents of a document layer may be encoded into a machine-readable form. In some embodiments, the encoded information may be represented using a 2-dimensional bar code. In some methods for preserving and maintaining document integrity, the contents of the document are printed on one side of a page and the machine-readable code is printed on the other side of the page. In some embodiments, a printed document containing the machine-readable code may be scanned and digitized, and content extracted from the scanned data. In some embodiments, the machine-readable code printed on the document is used to recreate layer data from the printed document.

23 Claims, 4 Drawing Sheets

SYSTEMS AND METHODS FOR PRESERVING AND MAINTAINING DOCUMENT INTEGRITY

BACKGROUND

1. Field of the Invention

The present invention relates to the field of physical document management and, in particular, to systems and methods for preserving and maintaining the integrity of printed documents.

2. Description of Related Art

Electronic documents, such as those created using many document and/or word processing applications, generally have several layers of data. Each layer in the document, termed a "document layer," contains some information related to the document or its contents. For example, the text seen by an end user creating, editing, or viewing a document may be represented in one layer of a document. Another layer may contain some of the drawings and/or figures that are part of the document. Finally, a third layer may contain the background over which the text and drawings are displayed. One of the advantages of organizing documents in layers is that each layer may be edited and/or created separately from other layers in the document. Thus, a layer may be changed without requiring any change in other layers associated with the document.

In addition to the layers described in the example above, a document may also contain "invisible layers." These invisible layers may contain data pertaining to the document or its contents rather than actual document content that is seen by users. Such data is also often called meta-data. An invisible layer may include, for example, information about people who have edited or viewed any part of the document. Another invisible layer may contain indexing information such as terms that occur frequently in the document. Users editing or viewing the document do not normally see invisible layers. Menus provided by the document processing software may allow a user to explicitly request the information contained in an invisible layer in order to view the contents of that layer.

Invisible document layers may also be used by other applications or the operating system to enforce policies concerning the document. These policies may restrict the people who have access to the document or may prevent applications or users from making changes to portions of the document. Document layers may also be used to authenticate and ensure the integrity of a document. For example, an invisible document layer may contain a digital signature that can be used to establish that an electronic version of a document originated with the entity associated with the digital signature and that no changes were made to the document after it was digitally signed.

Although invisible layer data can be used electronically, for example, to authenticate the content of a document and protect against alteration while it is in electronic form, such protection ceases when the document is printed. Printed documents contain only the actual content of a document, and data stored in document layers is lost. Thus, once a document has been printed, a recipient has no way of determining where the document originated, or where it is stored, or whether the document was altered, even though such information may have been available in document layers.

Preservation of layer data in printed documents would allow recipients of a printed document to automatically recreate preserved layer data, associate the preserved layer data with a document's contents, and facilitate the enforcement and maintenance of policies associated with the printed document.

SUMMARY

Systems and methods for maintaining and securing the integrity of printed documents are presented herein.

In some methods for preserving and maintaining document integrity, the contents of a document, or contents of a document layer may be encoded. In some embodiments, the encoded information may be stored in a document layer. In some embodiments, the encoded information may be represented using a 2-dimensional bar code. In some methods for preserving and maintaining document integrity, the contents of a document are printed on one-side of a page and the encoded information is printed on the obverse of the page.

In some methods for preserving and maintaining document integrity, a printed document with encoded information corresponding to contents of pages, or sections of the document, may be scanned and digitized. In some embodiments, the printed encoded information may be in the form of a two-dimensional bar code. In some embodiments, the scanned document data may be processed using character recognition and/or image processing algorithms to extract document content. In some embodiments, additional content may also be extracted from the encoded data printed on the document. In some embodiments, the content extracted from encoded data may be stored in a document layer. These and other embodiments are further explained below with respect to the following figures.

DETAILED DESCRIPTION

Methods and systems are described for securing and maintaining document integrity. In some embodiments, an encoding is generated for each section of a document and, is based at least in part on the contents of the section and/or on document layers associated with that section. In at least some embodiments, the encoding may be stored in a document layer, and a representation of the encoded information may be printed along with the document.

In some embodiments, a physical document that does not contain any encoded information may be scanned and digitized. In some embodiments, the scanned document is processed using character recognition and/or image processing algorithms to extract document content. An encoding may then be generated for various document sections based, at least in part, on the content of those sections, and the document may be printed with a representation of the generated encoding.

In some methods for preserving and maintaining document integrity, the contents of a document are printed on one-side of a page and the encoded information is printed on the obverse of the page.

In some methods for preserving and maintaining document integrity, both sides of each page of a printed document that includes encoded data may be scanned and digitized. In some embodiments, content may be extracted from the scanned document using character recognition and/or image processing techniques. In some embodiments, content may also be extracted from the encoded data printed on the document. In some methods for preserving and maintaining document integrity, extracted encoded data may be stored as a document layer.

Figure 1:
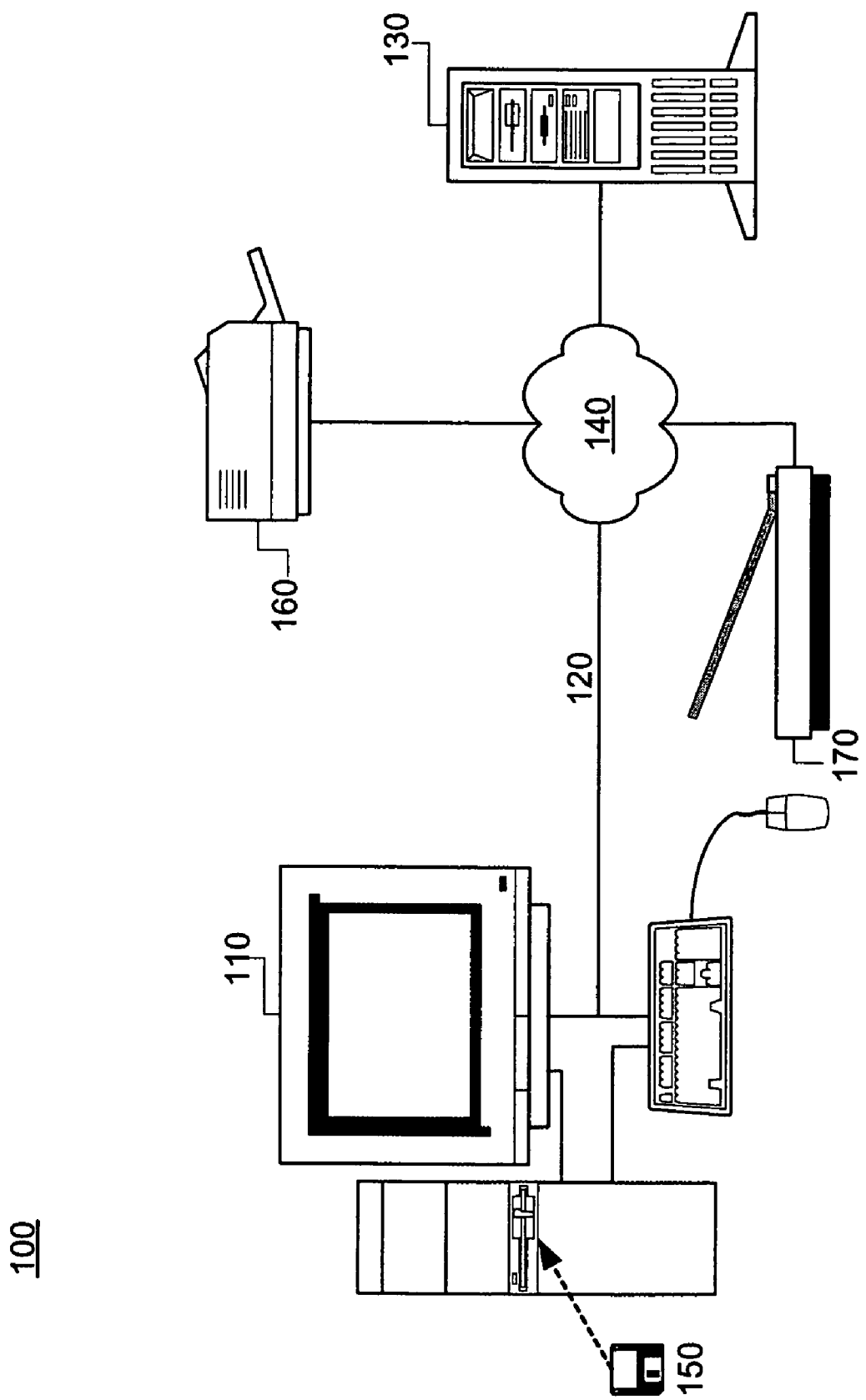
FIG. 1 shows a block diagram of a system for preserving and maintaining document integrity according to some embodiments of the invention.

FIG. 1 illustrates an exemplary system for preserving and maintaining document integrity according to embodiments of the invention. A computer software application may be deployed on a network of computers, as shown in FIG. 1, that are connected through communication links that allow information to be exchanged using conventional communication protocols and/or data port interfaces.

As shown in FIG. 1, exemplary system 100 includes a computing device 110 and a server 130. Further, computing device 110 and server 130 may communicate over a connection 120, which may pass through network 140. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing document-processing software (not shown) that allows the creation, editing, storing and processing of electronic documents. Document processing software could include commercially available document processing software such as Microsoft Word, Adobe Acrobat, or similar software. Documents created using the document processing software may be stored on computing device 110 or server 130 and made available to an application for preserving and maintaining document integrity according to embodiments of the invention.

Computing device 110 may also comprise removable media drive 150. Removable media drive 150 may include, for example, 3.5 inch floppy drives, CD-ROM drives, DVD ROM drives, CD±RW or DVD±RW drives, USB flash drives, and/or any other removable media drives consistent with embodiments of the present invention. In some embodiments consistent with the present invention, portions of the software application may reside on removable media and be read and executed by computing device 110 using removable media drive 150. In some embodiments, documents processed by applications executing methods for preserving and maintaining document integrity consistent with present invention may be stored on removable media and accessed through removable media drive 150.

Connection 120 couples computing device 110, server 130, printer 160, and scanner 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as Universal Serial Bus ("USB"), Small Computer Systems Interface ("SCSI"), IEEE 1394 High Performance Serial Bus ("Firewire"), and/or coaxial cable ports for transmission of data through the appropriate connection 120. In some embodiments, connection 120 may be a low-bandwidth connection, for example, a Digital Subscriber Line (DSL), an Asymmetric Digital Subscriber Line (ADSL), or a cable connection.

Network 140 may be, for example a Local Area Network (LAN), a Wide Area Network (WAN), or the Internet. In some embodiments consistent with the present invention, information sent over network 140 may be encrypted to ensure the security of the data being transmitted.

Printer 160 and Scanner 170 are connected to network 140 through connection 120. In some embodiments, printer 160 and scanner 170 may be connected directly to computing device 110 and/or server 130. Printer 160 may be used to print documents containing encoded information, such as two-dimensional bar codes, in accordance with some methods for preserving and maintaining document integrity. Printer 160 is capable of printing on both sides of a page. In some embodiments, the information contained in the document, as well as meta-data information associated with the document, such as indexing information, content descriptions, access lists, times of creation, editing, etc., may be encoded and stored as a document layer. In some embodiments, the encoded information may be printed on paper or other media using a two-dimensional bar code, or other machine-readable formats. In some embodiments, printer 170 may be a color printer capable of printing encoded information in the form of multi-colored two-dimensional bar codes. Documents stored on computing device 110, server 130, or on removable media may be printed on printer 170. Scanner 160 may be used to scan documents, including printed documents containing encoded information, in accordance with some methods of preserving and maintaining document integrity. Scanner 160 is capable of scanning both sides of pages in a printed document. Both printer 170 and scanner 160 may contain automatic document feeders to allow batch processing of documents. In some embodiments, scanner 160 may be capable of reading machine-readable code printed on documents. In some embodiments, documents scanned using scanner 170 may be stored on computing device 110 and/or server 130 for additional processing.

A computer software application may be deployed on any of the exemplary computers, as shown in FIG. 1. For example, computing device 110 could execute software that may be downloaded directly from server 130. In some embodiments a software application implementing methods for preserving and maintaining document integrity may be distributed between the various computing systems shown in FIG. 1.

Figure 2:
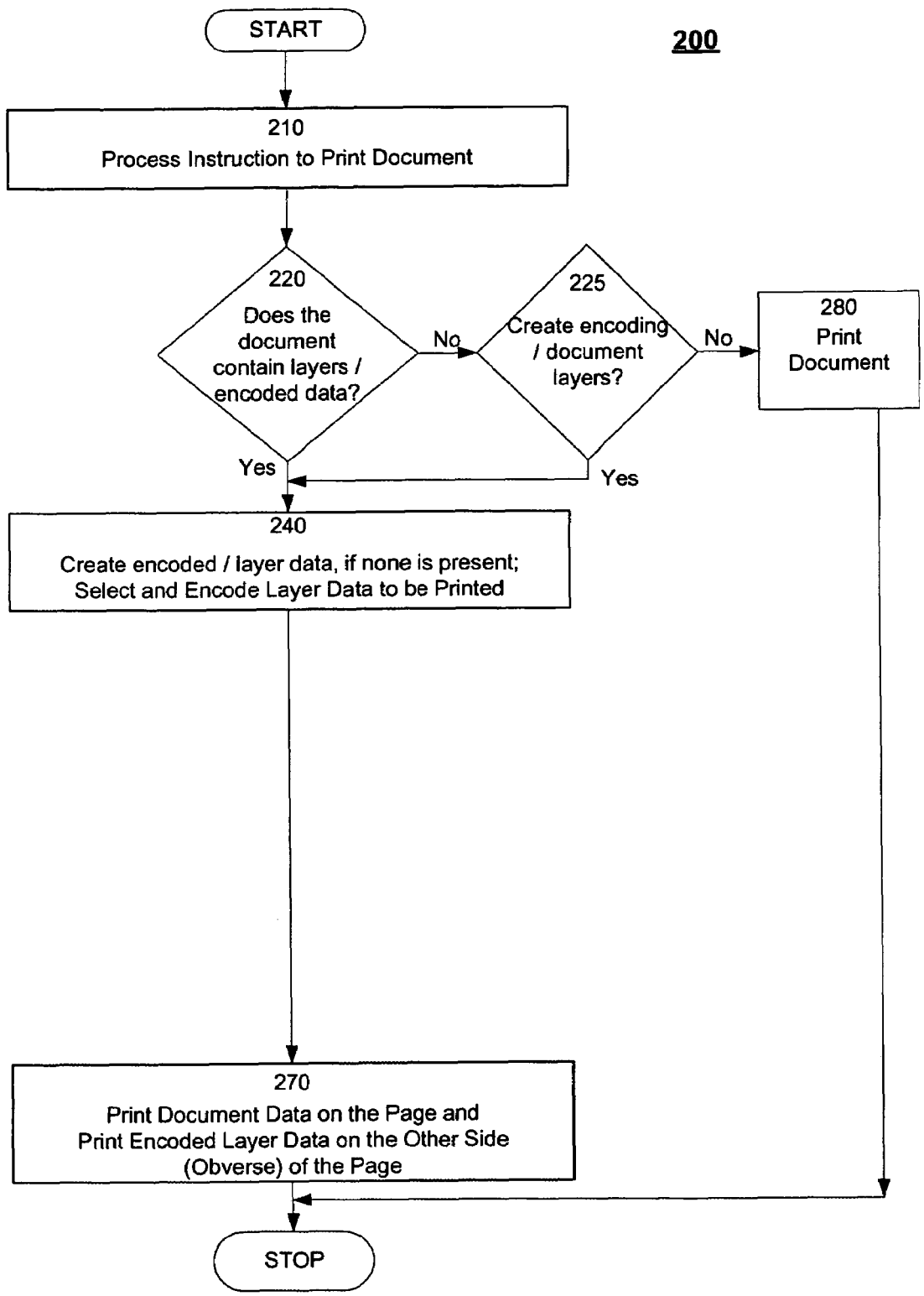
FIG. 2 illustrates a flowchart describing the printing of a document with codes corresponding to the contents of layers associated with document sections, according to some embodiments of the invention.

FIG. 2 is a flowchart describing one exemplary method of printing of a document with codes corresponding to the contents of layers associated with document pages, or sections, according to the invention. In some embodiments, an application implementing steps in flowchart 200 may be executed on computing device 110, or server 130. The application may operate on electronic documents stored on computing device 110 or server 130. In step 210, an instruction to print an electronic document is received by the application. In some embodiments, the application may receive the electronic document from another application, such as a document or word processing program. In some embodiments, the electronic document may have been created using document processing software, and an application executing steps in a method for preserving and maintaining document integrity may be embedded or linked to the document processing system, so that the execution of a "print" command on a document from within the document-processing system may invoke the embedded or linked application according to embodiments of the invention. For example, a user who wants to print an electronic document may be provided with a menu choice that allows the user to preserve layer data in the printed form of the document. If a user elects to preserve layer data in the printed document, the "print" command in the word processing system may invoke the linked application to preserve and maintain the integrity of the document prior to its actual printing. In step 220, the application determines if there is a layer data, or encoded information associated with the electronic document. If there is no layer data or encoded information associated with the document, a user may create layer data or, encoded information pertaining to the document in step 225. If a user chooses not to create any layer data pertaining to document information then the contents of the document are printed in step 280. If a user chooses to create layer data pertaining to document information, then in step 225, layer data may be generated for documents that do not have such information associated with them. For example, an index of the contents of each document section may be generated and stored as a document layer. In step 240, if layer data is already present, then some or all of the layer data may be selected for encoding and printing along with the document's contents. For example, information contained in document layers, such as an index of the document's contents, may be encoded and the encoding associated with the document. When the electronic document is finally printed, the encoding associated with the document may be represented in the printed version of the document in any machine-readable format, such as for example, a two-dimensional bar code. In the electronic version of a document, the encoding may be represented electronically in any manner that facilitates the printing of a machine-readable form of the encoding.

In step 270, the code is printed along with the contents of the page or document section. In some methods for preserving and maintaining document integrity, the contents of a document are printed on one-side of a page and the encoded information is printed on the obverse of the page.

Figure 3:
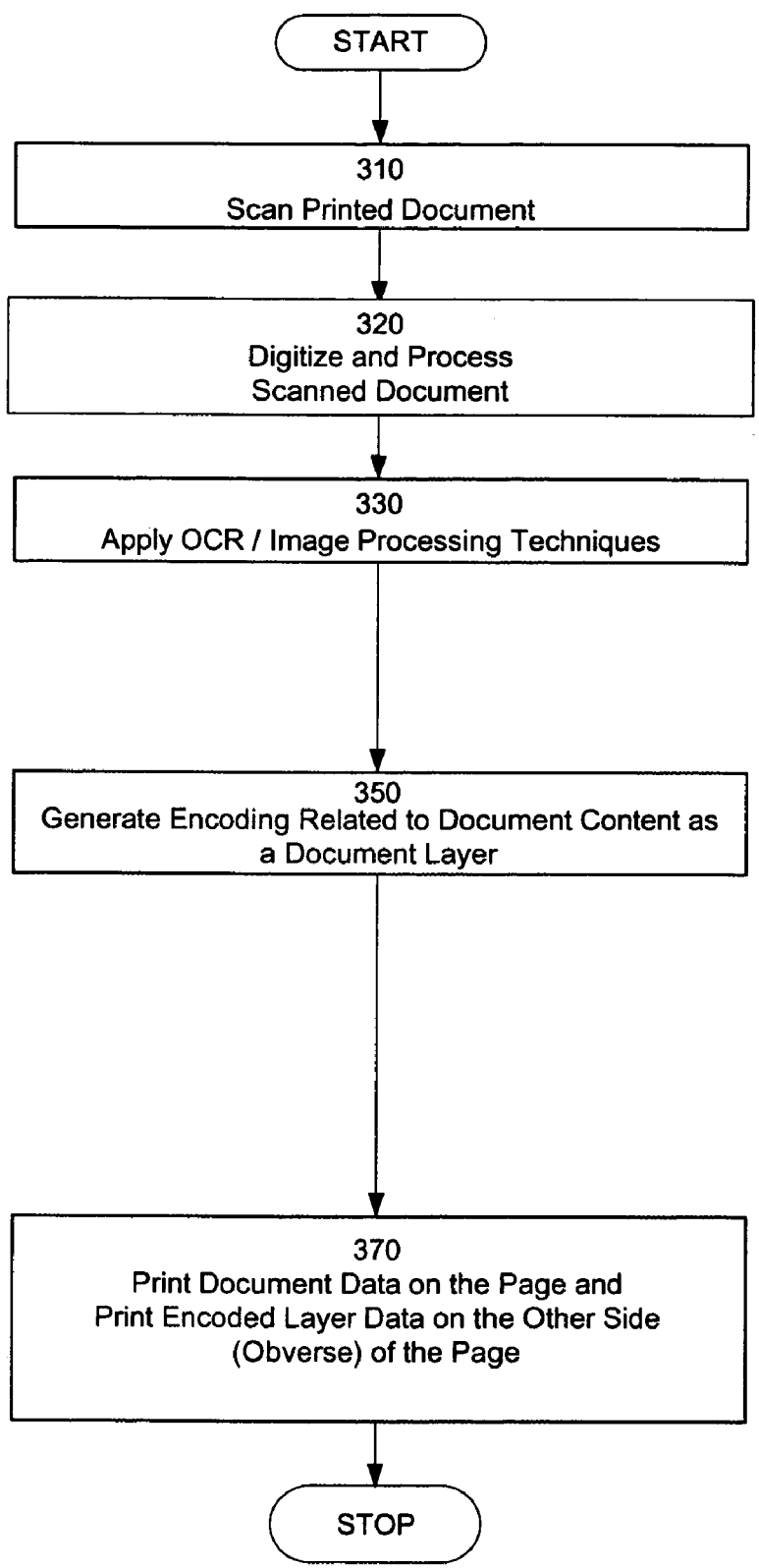
FIG. 3 illustrates a method for adding encoded data to printed documents according to some embodiments of the invention.

FIG. 3 is a flowchart 300 illustrating the steps of an exemplary method adding encoded data or layer information to printed documents according to some embodiments of the invention. In some embodiments, steps in flowchart 300 may be performed by computing device 110 or server 130. In step 310, the printed document is scanned by, for example, scanner 160. In step 320, the scanned data is digitized and processed. In some embodiments, some initial processing of the scanned document may occur at scanner 160, before the scanned document transferred to computing device 110 or server 130. For example, the scanner may translate the scanned document into an image format requested by the application, such as the Portable Document Format ("PDF") or the Tagged Image File Format ("TIFF"). In step 330, the scanned document is processed further using standard character recognition and/or image processing techniques. Character recognition algorithms are well known and widely used, and may include, for example, Optical Character Recognition (OCR) techniques, which apply algorithms that use fonts, distance and/or feature points to extract content from scanned images. In some embodiments, the scanned image may also be processed using well-known image processing algorithms. For example, object segmentation techniques may used to construct and extract document objects from aggregations of pixels.

In step 350, the extracted document content may be processed to generate additional information pertaining to the document. For example, an index may be created based on the contents of the documents. In general, the type of information created may depend on a variety of factors, such as the nature of the document, user applications, and user-defined policies associated with the document. In some embodiments, additional information that is generated may be encoded into machine-readable code and stored as a document layer.

In step 370, the code is printed along with the contents of the page or document section. In some methods for preserving and maintaining document integrity, the contents of a document are printed on one-side of a page and the encoded information is printed on the obverse of the page.

Figure 4:
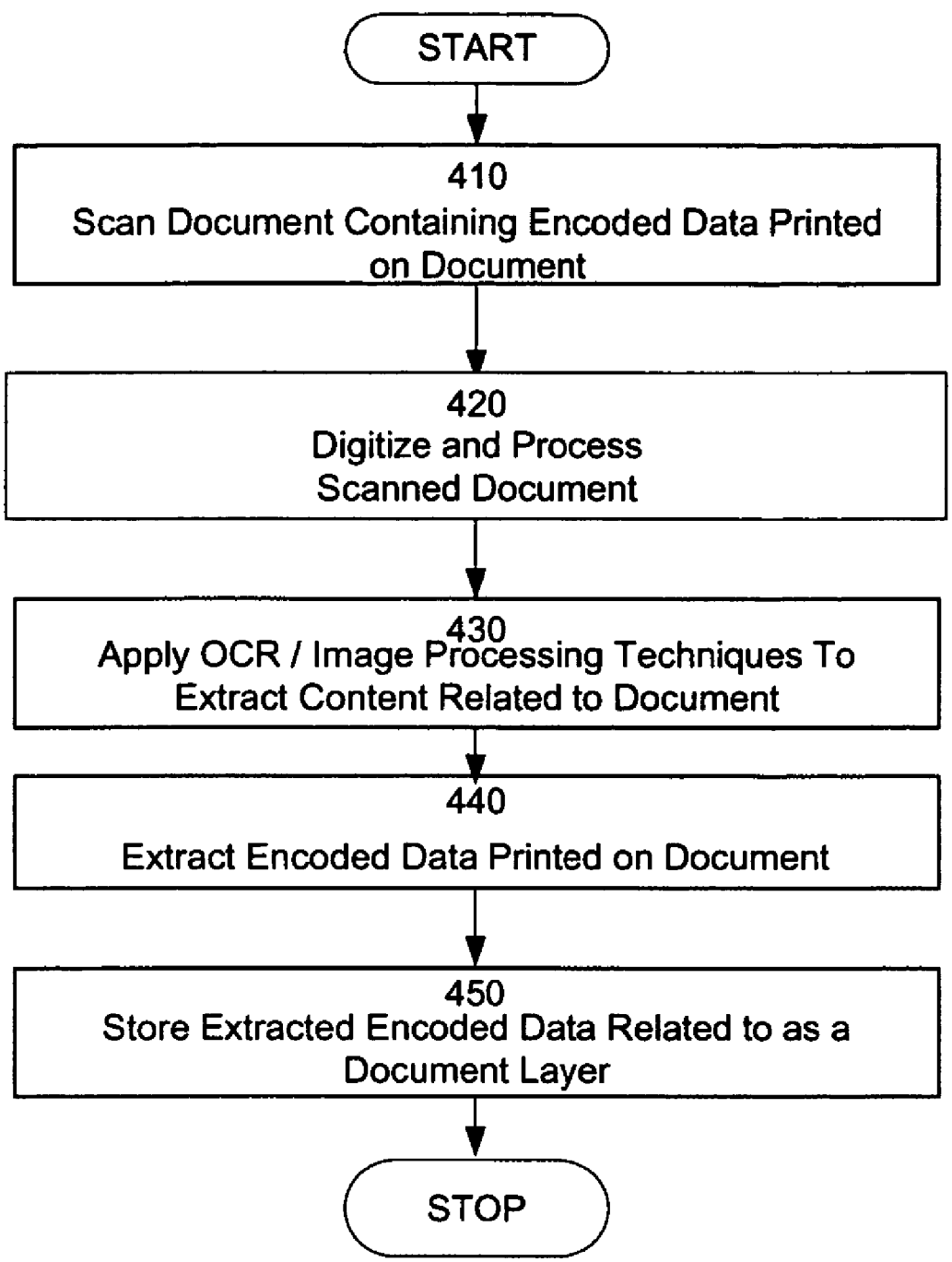
FIG. 4 depicts a flowchart for extracting layer data from a printed document according to some embodiments of the invention.

FIG. 4 depicts a flowchart for extracting layer data from a printed document containing encoded information according to some embodiments of the invention. In some embodiments, steps in flowchart 400 may be performed by components depicted in system 100 under the control of an application program running on computing device 110 or server 130. In step 410, the printed document containing machine-readable code is scanned. In some embodiments, scanning of the document may be performed by scanner 160, which scans both sides of each page in the document. In some embodiments, scanner 160 may also be capable of reading the machine-readable code, such as an exemplary two-dimensional bar code, printed on documents. In step 420, the scanned data is digitized and processed. In step 430, the scanned document is processed further using standard character recognition and/or image processing techniques. Character recognition algorithms include, for example, Optical Character Recognition (OCR) techniques, which apply algorithms that use fonts, distance, and/or feature points to extract content from scanned images. In some embodiments, the scanned image may also be processed using well-known image processing algorithms. For example, object segmentation techniques may used to construct and extract document objects from aggregations of pixels. In step 440, the encoded machine-readable code printed on the document may be extracted and/or processed. For example, a two-dimensional bar code may be processed to extract information pertaining to the document. In step 450, the information contained in, and extracted from, the machine-readable code printed on the document is stored with the document. In some embodiments, the document and the code may be stored as document layers.

Further, methods consistent with embodiments of the invention may conveniently be implemented using program modules, hardware modules, or a combination of program and hardware modules. Such modules, when executed, may perform the steps and features disclosed herein, including those disclosed with reference to the exemplary flow charts shown in the figures. The operations, stages, and procedures described above and illustrated in the accompanying drawings are sufficiently disclosed to permit one of ordinary skill in the art to practice the invention. Moreover, there are many computers and operating systems that may be used in practicing embodiments of the instant invention and, therefore, no detailed computer program could be provided that would be applicable to these many different systems. Each user of a particular computer will be aware of the language, hardware, and tools that which are most useful for that user's needs and purposes.

The above-noted features and aspects of the present invention may be implemented in various environments. Such environments and related applications may be specially constructed for performing the various processes and operations of the invention, or they may include a general-purpose computer or computing platform selectively activated or reconfigured by program code to provide the functionality. The processes disclosed herein are not inherently related to any particular computer or other apparatus, and aspects of these processes may be implemented by any suitable combination of hardware, software, and/or firmware. For example, various general-purpose machines may be used with programs written in accordance with teachings of the invention, or it may be more convenient to construct a specialized apparatus or system to perform the required methods and techniques.

Embodiments of the present invention may be implemented as computer-readable media that include program instructions or program code for performing various computer-implemented operations. The program instructions may be those specially designed and constructed for the purposes of the invention, or they may be of the kind well known and available to those having skill in the computer software arts. Examples of program instructions include, for example, machine code, such as produced by a compiler, and files containing a high-level code that can be executed by the computer using an interpreter.

Other embodiments of the invention will be apparent to those skilled in the art from consideration of the specification and practice of the embodiments of the invention disclosed herein. It is intended that the specification and examples be considered as exemplary only, with a true scope and spirit of the invention being indicated by the following claims. As such, the invention is limited only by the following claims.

The invention claimed is:

1. A method comprising:
   selecting document layer data for encoding;
   encoding the selected document layer data in machine-readable format to form associated machine-readable code; and
   printing the contents of each page of the document on one side of the page and printing the associated machine-readable code on the other side of the page.

2. The method of claim 1, wherein the associated machine-readable code comprises a two dimensional bar code.

3. A computer-readable medium that stores instructions, which when executed by a computer perform steps in a method for preserving and maintaining document integrity, the steps comprising:
   selecting document layer data for encoding;
   encoding the selected document layer data in a machine-readable format to form associated machine-readable code; and
   printing the contents of each page of the document on one side of the page and printing the associated machine-readable code on the other side of the page.

4. The method of claim 3, wherein the machine-readable code comprises a two dimensional bar code.

5. A computer readable memory containing instructions for controlling a computer system to perform steps in a method for preserving and maintaining document integrity, the steps comprising:
   selecting document layer data for encoding;
   encoding the selected document layer data in a machine-readable format to form associated machine-readable code; and
   printing the contents of each page of the document on one side of the page and printing the associated machine-readable code on the other side of the page.

6. The method of claim 5, wherein the machine-readable code comprises a two dimensional bar code.

7. A computer processor executing instructions that perform steps in a method for preserving and maintaining document integrity, the steps comprising:
   selecting document layer data for encoding;
   encoding the selected document layer data in a machine-readable format to form associated machine-readable code; and
   printing the contents of each page of the document on one side of the page and printing the associated machine-readable code on the other side of the page.

8. The method of claim 7, wherein the machine-readable code comprises a two dimensional bar code.

9. A system for preserving and maintaining document integrity comprising:
   selecting document layer data for encoding;
   encoding the selected document layer data in a machine-readable format to form associated machine-readable code; and
   printing the contents of each page of the document on one side of the page and printing the associated machine-readable code on the other side of the page.

10. The method of claim 9, wherein the machine-readable code comprises a two dimensional bar code.

11. A method of retrieving the content of document pages and metadata associated with document pages, from a printed document containing a machine-readable code comprising:
    scanning the printed document containing the machine-readable code;
    processing the scanned document data to extract document content;
    processing the scanned machine-readable code to extract document meta-data; and
    associating the extracted document meta-data with the extracted document content.

12. The method of claim 11, wherein scanning the printed document further comprises reading machine-readable code on the document.

13. The method of claim 11, wherein processing the scanned document section data to extract document content further comprises using character recognition and/or image processing techniques on the scanned data.

14. The method of claim 11, wherein the machine-readable code comprises a two-dimensional bar code.

15. The method of claim 11, wherein processing the scanned machine readable code to extract document meta-data further comprises correlating the data read from the machine readable code with contents of document sections.

16. The method of claim 11, wherein associating the extracted document meta-data with the extracted document content further comprises storing the extracted document meta-data as a document layer.

17. A computer readable medium containing instructions for controlling a computer system to perform steps in a method for retrieving the content of document sections and meta-data associated with document sections, from a printed document containing a machine-readable code, the steps comprising:
    scanning the printed document containing the machine-readable code;
    processing the scanned document section data to extract document content;
    processing the scanned machine-readable code to extract document meta-data; and
    associating the extracted document meta-data with the extracted document content.

18. The method of claim 17, wherein processing the scanned document section data to extract document content further comprises using character recognition and/or image processing techniques on the scanned data.

19. The method of claim 17, wherein processing the scanned machine readable code to extract document meta-data further comprises correlating the data read from the machine readable code with contents of document sections.

20. The method of claim 17, wherein associating the extracted document meta-data with the extracted document content further comprises storing the extracted document meta-data as a document layer.

21. A processor executing instructions for controlling a computer system to perform steps in a method for retrieving the content of document sections and meta-data associated with document sections, from a printed document containing a machine-readable encoding, the steps comprising:

scanning the printed document containing the machine-readable code;

processing the scanned document section data to extract document content;

processing the scanned machine-readable code to extract document meta-data; and associating the extracted document meta-data with the extracted document content.

22. A computer readable memory containing instructions for controlling a computer system to perform steps in a method for retrieving the content of document sections and meta-data associated with document sections, from a printed document containing a machine-readable code, the steps comprising:

scanning the printed document containing the machine-readable code;

processing the scanned document section data to extract document content;

processing the scanned machine-readable code to extract document meta-data; and associating the extracted document meta-data with the extracted document content.

23. A system for retrieving the content of document sections and metadata associated with document sections, from a printed document containing a machine-readable code comprising:

scanning the printed document containing the machine-readable code;

processing the scanned document section data to extract document content;

processing the scanned machine-readable code to extract document meta-data; and associating the extracted document meta-data with the extracted document content.

* * * * *